US008743567B2

(12) United States Patent
Singnurkar (10) Patent No.: US 8,743,567 B2
(45) Date of Patent: Jun. 3, 2014

(54) MULTI-OUTPUT VOLTAGE CONVERTER WITH SWITCHING ARRANGEMENT AND METHOD FOR VOLTAGE CONVERSION

(75) Inventor: Pramod Singnurkar, Graz (AT)

(73) Assignee: AMS AG, Unterpremstätten (AT)

( * ) Notice: Subject to any disclaimer, the term of this patent is extended or adjusted under 35 U.S.C. 154(b) by 140 days.

(21) Appl. No.: 13/332,279

(22) Filed: Dec. 20, 2011

(65) Prior Publication Data
US 2012/0187932 A1 Jul. 26, 2012

(30) Foreign Application Priority Data

Dec. 20, 2010 (EP) .................................... 10015856

(51) Int. Cl.
*H02M 3/335* (2006.01)
*G05F 1/00* (2006.01)

(52) U.S. Cl.
USPC ................................ 363/24; 363/20; 323/282

(58) Field of Classification Search
USPC .................................. 363/20, 22, 24; 323/282
See application file for complete search history.

(56) References Cited

U.S. PATENT DOCUMENTS

| 5,894,214 | A * | 4/1999 | Jiang | 323/222 |
|---|---|---|---|---|
| 6,222,351 | B1 * | 4/2001 | Fontanella et al. | 323/267 |
| 7,446,521 | B2 | 11/2008 | Taurand | |
| 7,723,965 | B2 * | 5/2010 | Lesso et al. | 323/225 |
| 8,305,054 | B2 * | 11/2012 | Chen et al. | 323/225 |
| 2002/0093315 | A1 | 7/2002 | Sluijs | |
| 2005/0029996 | A1 | 2/2005 | Murakami | |
| 2005/0088160 | A1 * | 4/2005 | Tanaka et al. | 323/284 |
| 2007/0030617 | A1 | 2/2007 | Derckx et al. | |
| 2007/0252563 | A1 * | 11/2007 | Kumagai et al. | 323/267 |
| 2008/0315850 | A1 * | 12/2008 | Nishida | 323/284 |
| 2009/0167264 | A1 | 7/2009 | Bayer et al. | |
| 2010/0194359 | A1 * | 8/2010 | Notman | 323/267 |
| 2011/0043181 | A1 * | 2/2011 | Jing et al. | 323/288 |
| 2011/0248691 | A1 * | 10/2011 | Williams | 323/271 |

FOREIGN PATENT DOCUMENTS

| DE | 10 2006 032 418 | 1/2008 |
|---|---|---|
| EP | 1 936 793 | 11/2007 |
| EP | 1 931 019 | 12/2007 |

OTHER PUBLICATIONS

Y. Sharma, "Single Boost Converter Builds Dual Polarity Supply", Power Electronics Technology, Sep. 2006, pp. 42-46.

* cited by examiner

*Primary Examiner* — Adolf Berhane
*Assistant Examiner* — Emily P Pham
(74) *Attorney, Agent, or Firm* — McDermott Will & Emery LLP (57) ABSTRACT

A voltage converter (10) comprises an input (11) for receiving an input voltage (VIN), a first output (12) for providing a first output voltage (VPOS) and a second output (13) for providing a second output voltage (VNEG). The first output voltage (VPOS) and the second output voltage (VNEG) have opposite polarities. A switching arrangement (14) of the voltage converter (10) is designed to provide energy to an inductor (15) in a charging phase (A) of operation and to provide energy from the inductor (15) to the first output (12) and, via a flying capacitor (16), to the second output (13) in a discharging phase of operation. The first duration (t1) of the charging phase (A) of operation is controlled such that the difference between a first predetermined value and the sum of the absolute value of the first output voltage (VPOS) and of the second output voltage (VNEG) is minimized.

15 Claims, 10 Drawing Sheets

MULTI-OUTPUT VOLTAGE CONVERTER WITH SWITCHING ARRANGEMENT AND METHOD FOR VOLTAGE CONVERSION

RELATED APPLICATIONS

This application claims the priority of European application no. 10015856.7 filed Dec. 20, 2010, the entire content of which is hereby incorporated by reference.

BACKGROUND OF THE INVENTION

A dual output converter generates a first and a second output voltage. A boost converter provides output voltages which have a higher value than an input voltage. Contrary to that a buck converter generates output voltages with values which are lower than the value of the input voltage.

Document DE 10206032418 A1 refers to a voltage converter comprising an inductor and four switches. The voltage converter generates a first and a second output voltage.

Document US 2009/0167264 A1 is related to a converter usable for dual voltage supply. The converter comprises an inductor, a first and a second rectifier element as well as a positive and a negative supply output.

Document "Single Boost Converter Builds Dual Polarity Supply", Y. Sharma, Power Electronics Technology, September 2006, pp 42-46 describes a boost converter generating a positive and a negative voltage by means of an inductor and a charge-pump capacitor. During one phase of operation energy is stored in the inductor. The duration of this phase of operation only depends on a comparison of the first output voltage and a reference voltage.

SUMMARY OF THE INVENTION

It is an object of the present invention to provide a voltage converter and a method for voltage conversion with a high efficiency.

In one embodiment, a voltage converter comprises an input, a first and a second output as well as a switching arrangement.

The input of the voltage converter is designed for receiving an input voltage and providing the input voltage to the switching arrangement. The first output of the voltage converter is designed for providing a first output voltage. Moreover, the second output of the voltage converter is designed for providing a second output voltage. The first and the second output voltage have opposite polarities. The switching arrangement is designed to provide energy to an inductor in a charging phase of operation and to provide energy from the inductor to the first output and, via a flying capacitor, to the second output in a discharging phase of operation. The first duration of the charging phase of operation is controlled such that the difference between a first predetermined value and the sum of the absolute value of the first output voltage and of the absolute value of the second output voltage is minimized.

During the charging phase of operation, energy is advantageously provided to the inductor through the input of the voltage converter. The switching arrangement receives the input voltage and converts the input voltage into the first and the second output voltage. The switching arrangement provides the first output voltage to the first output of the voltage converter and the second output voltage to the second output of the voltage converter. The first duration is controlled such that the energy provided to the voltage converter is sufficient to generate the first and the second output voltage with their predetermined values. Thus, by the exact calculation of the first duration, it is avoided that the energy that is provided to the voltage converter is too high. This increases the efficiency of the voltage conversion.

In an embodiment, the first and the second output voltage have opposite polarities with respect to a ground potential that can be tapped at a reference potential terminal. The first output voltage is provided between the first output and the reference potential terminal. The second output voltage is provided between the second output and the reference potential terminal.

In an embodiment, the first output voltage has a positive polarity with respect to the ground potential at the reference potential terminal. The second output voltage has a negative polarity with respect to the ground potential at the reference potential terminal.

In an embodiment, in the discharging phase of operation, energy is provided from the inductor via the first output to a first storage capacitor and a first load. The first storage capacitor is arranged between the first output and the reference potential terminal. Moreover, in the discharging phase of operation, energy is provided from the inductor to a second storage capacitor and a second load via the flying capacitor and the second output. The second storage capacitor is arranged between the second output and the reference potential terminal.

In an embodiment, the discharging phase of operation of the switching arrangement comprises a positive and a negative discharging phase. The positive and the negative discharging phase are designed for distributing the energy that is provided to the voltage converter to the first and to the second output. The second duration of the positive discharging phase is controlled such that a difference between the first output voltage and a predetermined value of the first output voltage is minimized. The third duration of the negative discharging phase is controlled such that the difference between the second output voltage and the predetermined value of the second output voltage is minimized.

In an embodiment, the inductor and the flying capacitor are connected in series. The input of the voltage converter is coupled to a first terminal of the inductor. A second terminal of the inductor is connected to a first electrode of the flying capacitor. The first electrode of the flying capacitor is coupled via a first switch of the switching arrangement to the reference potential terminal. A third switch of the switching arrangement couples a second terminal of the flying capacitor to the reference potential terminal. The first and the third switch can be implemented as transistors, such as field-effect transistors.

In an embodiment, a second switch of the switching arrangement couples the second terminal of the inductor to the first output. A fourth switch of the switching arrangement couples the second electrode of the flying capacitor to the second output terminal. The second and the fourth switch can be implemented as transistors, preferably as field-effect transistors, or as rectifiers, such as diodes.

In an embodiment, the maximum voltage which is applied to one of the switches is equal to the absolute value of the first output voltage or to the absolute value of the second output voltage. Thus, for the generation for example of +5 V and −5 V output voltages, transistors which provide an isolation of 5 V are suitable. This leads to a low cost for production. Resulting from the low voltage stress, a reduced size of the power transistor respectively power transistors can be used. These margins of the maximum voltages improve efficiency, since the voltage swings are limited.

The voltage converter can be designed such that the inductor current which flows through the inductor is reduced. Thus, the voltage is converted with a high efficiency. In addition, the high efficiency leads to the capacity to drive large output currents which supply the load. The inductor preferably is designed as a coil.

In an embodiment, a semiconductor body comprises the voltage converter, wherein the inductor and the flying capacitor are external devices that are coupled to the semiconductor body. Thus, the voltage converter besides the inductor and the flying capacitor is arranged on a first area of the semiconductor body. A single semiconductor body can comprise the voltage converter with the exception of the inductor and the flying capacitor.

In an embodiment, a method for voltage conversion comprises converting an input voltage into a first and a second output voltage. The first output voltage and the second output voltage have opposite polarities. The conversion is performed by providing energy to an inductor in a charging phase of operation and providing energy from the inductor to the first output at which the first output voltage is provided and, via a flying capacitor, to the second output at which the second output voltage is provided in a discharging phase of operation. The first duration of the charging phase of operation is controlled such that the difference between a first predetermined value and the sum of the absolute value of the first output voltage and of the absolute value of the second output voltage is minimized.

In an embodiment, the low peak-to-peak inductor current ripple requires only a low inductivity value of the inductor. The small average inductor current makes it possible to use a small inductor. The method of zero voltage switching can be applied for further improvement of the efficiency.

BRIEF DESCRIPTION OF THE DRAWINGS

The following description of figures of exemplary embodiments may further illustrate and explain the invention. Devices with the same structure and the same effect, respectively, appear with equivalent reference symbols. In so far as circuits or devices correspond to one another in terms of their function in different figures, the description thereof is not repeated for each of the following figures.

DETAILED DESCRIPTION OF THE DRAWINGS

Figure 1A:
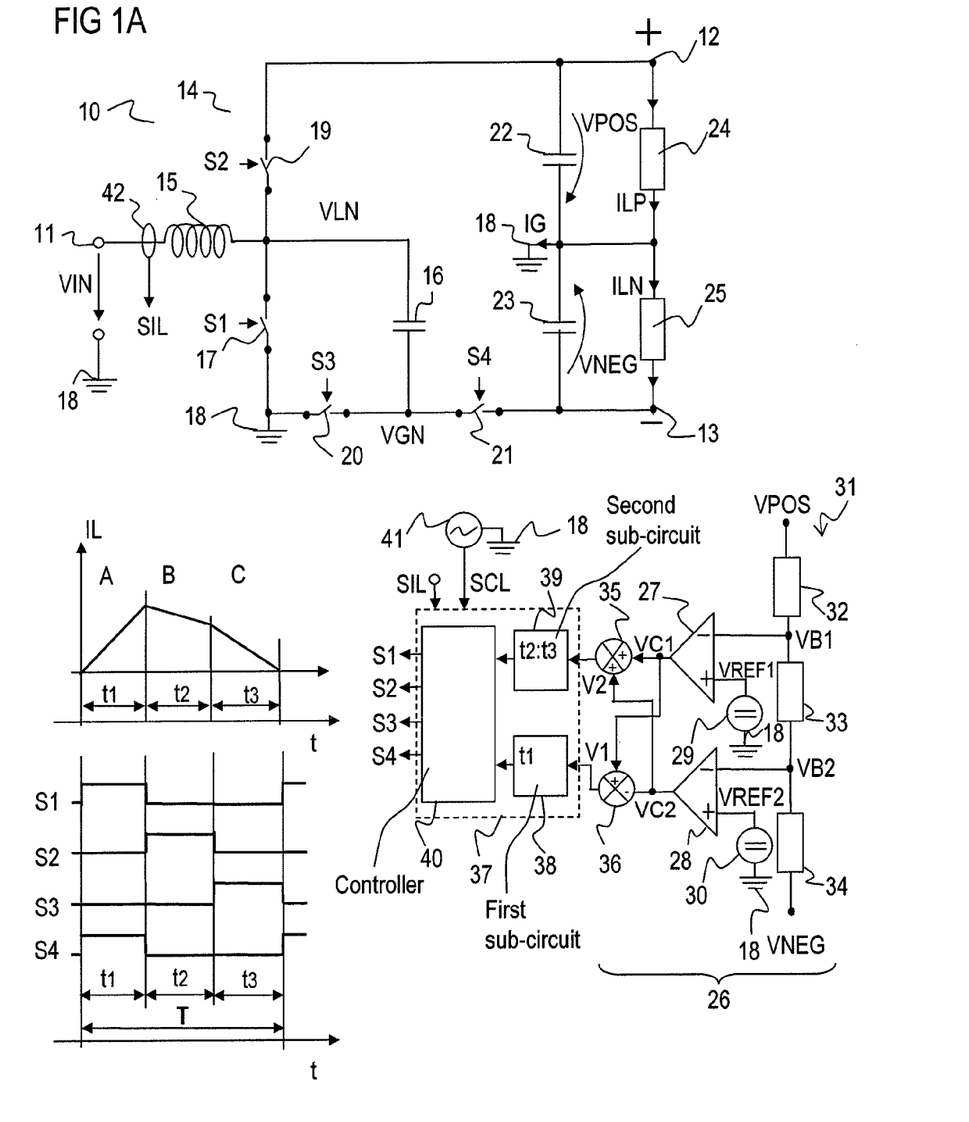
FIGS. 1A to 1H show exemplary embodiments of a voltage converter according to the invention.

FIG. 1A shows an exemplary embodiment of a voltage converter according to the principle presented. The voltage converter 10 comprises an input 11 and a first and a second output 12, 13. A switching arrangement 14 couples the input 11 to the first and the second output 12, 13. The switching arrangement 14 comprises an inductor 15 and a flying capacitor 16. The inductor 15 and the flying capacitor 16 are connected in series. The input 11 is coupled to a first terminal of the inductor 15. A second terminal of the inductor 15 is coupled via a first switch 17 of the switching arrangement 14 to a reference potential terminal 18. A second switch 19 of the switching arrangement 14 couples the second terminal of the inductor 15 to the first output 12. A first electrode of the flying capacitor 16 is permanently connected to the second terminal of the inductor 15. A third switch 20 of the switching arrangement 14 couples a second terminal of the flying capacitor 16 to the reference potential terminal 18. A fourth switch 21 of the switching arrangement 14 couples the second electrode of the flying capacitor 16 to the second output terminal 13.

A first storage capacitor 22 is arranged between the first output 12 and the reference potential terminal 18. Correspondingly, a second storage capacitor 23 is arranged between the second output 13 and the reference potential terminal 18. A first load resistor 24 couples the first output 12 to the reference potential terminal 18 and a second load resistor 25 couples the second output 13 to the reference potential terminal 18. The first and the second load resistor 24, 25 simulate a load which is connected to the first and to the second output 12, 13.

Moreover, the voltage converter 10 comprises a feedback unit 26. The feedback unit 26 comprises a first and a second controlling amplifier 27, 28. A first input of the first controlling amplifier 27 is coupled to the first output 12. A second input of the first controlling amplifier 27 is coupled via a first reference voltage source 29 to the reference potential terminal 18. The second controlling amplifier 28 has a first input which is coupled to the second output 13. A second input of the second controlling amplifier 28 is coupled via a second reference voltage source 30 to the reference potential terminal 18. The first and the second controlling amplifier 27, 28 can be realized as operational transconductance amplifiers, abbreviated OTA.

Further on, the voltage converter 10 uses a voltage divider 31 between the first output 12 and the second output 13. The feedback unit 26 comprises the voltage divider 31. The voltage divider 31 couples the first and the second output 12, 13 to the first input of the first controlling amplifier 27 and to the first input of the second controlling amplifier 28. The voltage divider 31 comprises a first, a second and a third resistor 32 to 34. The first, second and third resistor 32, 33, 34 are connected in series. The first resistor 32 is arranged between the first output 12 and the first input of the first controlling amplifier 27. Similarly, the third resistor 34 is arranged between the second output 13 and the first input of the second controlling amplifier 28. The second resistor 32 couples the first resistor 32 to the third resistor 34.

Further on, the feedback unit 26 comprises an adding unit 35 with two input terminals which are connected to an output of the first controlling amplifier 27 and to an output of the second controlling amplifier 28. In addition, a subtracting unit 36 has two inputs. A first input of the subtracting unit 36 is connected to the output of the first controlling amplifier 27 and a second input of the subtracting unit 36 is connected to the output of the second controlling amplifier 28. The first input of the subtracting unit 36 is the positive input and the second input of the subtracting unit 36 is the negative input. Thus, the adding unit 35 has one output and the subtracting unit 36 has also one output which form the two outputs of the feedback unit 26.

Furthermore, the voltage converter 10 comprises a control circuit 37. Two inputs of the control circuit 37 are connected to the two outputs of the feedback unit 26. A first output of the control circuit 37 is connected to a control terminal of the first switch 17. Correspondingly, a second, a third and a fourth output of the control circuit 37 are connected to the control terminals of the second, third and fourth switch 19, 20, 21. The control circuit 37 comprises a first sub-circuit 38 having an input that is connected to the output of the subtracting unit 36. Furthermore, the control circuit 37 comprises a second sub-circuit 39 having an input that is connected to the output of the adding unit 35. A controller 40 of the control circuit 37 is connected on its input side to the first and to the second sub-circuit 38, 39. The output side of the controller 40 is connected to the first, second, third and fourth output of the control circuit 37.

Moreover, the control circuit 37 comprises a clock input terminal. An oscillator 41 of the voltage converter 10 is connected to the clock input terminal of the control circuit 37. A current sensor 42 is arranged such that the current sensor 42 measures the inductor current ILC flowing through the inductor 15. An output of the current sensor 42 is connected to a sensing input of the control circuit 37. The current sensor 42 is arranged between the input 11 and the first terminal of the inductor 15.

An input voltage VIN is provided to the input 11. The input voltage VIN is applied between the input 11 and the reference potential terminal 18. A ground potential is tapped at the reference potential terminal 18. A first output voltage VPOS can be tapped-off at the first output 12. Thus, the first output voltage VPOS is provided between the first output 12 and the reference potential terminal 18. The first output voltage VPOS has a positive polarity with respect to the ground potential at the reference potential terminal 18. A second output voltage VNEG is tapped-off at the second output 13. Similarly, the second output voltage VNEG is applied between the second output 13 and the reference potential terminal 18. The second output voltage VNEG has a negative polarity with respect to the ground potential at the reference potential terminal 18. A first, a second, a third and a fourth control signal S1, S2, S3, S4 is generated by the control circuit 37 by means of the controller 40 and is provided to the control terminals of the first, second, third and fourth switch 17, 19, 20, 21, respectively. The voltage converter 10 comprises a charging phase A and a discharging phase of operation. The discharging phase is divided into a positive and a negative discharging phase of operation B, C. In the charging phase A of operation, energy is stored in the inductor 15. In the positive discharging phase B, the energy that is stored in the inductor 15 is partially transferred to the first storage capacitor 22. Thus, the first output voltage VPOS is increased in the positive discharging phase of operation B. The negative discharging phase C is used to provide energy to the second output 13. In the negative discharging phase of operation C, energy is transferred from the inductor 15 to the flying capacitor 16. During the charging phase A of operation, energy stored in the flying capacitor 16 is transferred to the second storage capacitor 23.

In the charging phase A of operation, the first and the fourth switch 17, 21 are closed and the second and the third switch 19, 20 are open. In the positive discharging phase B of operation, the second switch 19 is closed and the first, the third and the fourth switch 17, 20, 21 are open. In the negative discharging phase C of operation, the third switch 20 is closed and the first, the second and the fourth switch 17, 19, 21 are open. The charging phase A of operation has the first duration t1. Similarly, the positive and the negative discharging phase B, C have the second and the third duration t2, t3. The oscillator 41 generates a clock signal SCL which is provided to the control circuit 37. The clock signal SCL has a cycle time T. The cycle time T is constant. The cycle time T is equal to the sum of the durations of the charging phase A, the positive and the negative discharging phase B, C according to the following equation:

$$T=t1+t2+t3$$

The equation above is valid in a continuous conduction mode, wherein the inductor current ILC is continuous. In this mode, the inductor current ILC does for example not obtain the value zero.

The voltage divider 31 generates a first and a second divider voltage VB1, VB2. The first divider voltage VB1 is generated at a node between the first and the second resistor 32, 33. Correspondingly, the second divider voltage VB2 is provided at a node between the second and the third resistor 33, 34. The first divider voltage VB1 is provided to the first input of the first controlling amplifier 27. A first reference voltage VREF1 is provided to the second input of the first controlling amplifier 27. Similarly, the second divider voltage VB2 is applied to the first input of the second controlling amplifier 28. Further on, a second reference voltage VREF2 is applied to the second input of the second controlling amplifier 28. The first and the second reference voltage VREF1, VREF2 are generated by the first and the second reference voltage source 29, 30, respectively.

The first inputs of the first and the second controlling amplifier 27, 28 are inverting inputs. Thus, the second inputs of the first and the second controlling amplifier 27, 28 are non-inverting inputs. A first voltage signal VC1 at the output of the first controlling amplifier 27 depends on the difference between the first divider voltage VB1 and the first reference voltage VREF1. Also a second voltage signal VC2 at the output of the second controlling amplifier 28 depends on a difference of the second divider voltage VB2 and second reference voltage VREF2. By the adding unit 35 the output signals VC1, VC2 of the first and the second controlling amplifier 27, 28 are added and a resulting second feedback signal V2 is provided to the second sub-circuit 39. The second sub-circuit 39 is designed for the control of the ratio of the second to the third duration t2:t3. The second feedback signal V2 of the adding unit 35 is a function of the difference between the absolute value of the first output voltage VPOS and the absolute value of the second output voltage VNEG.

The subtracting unit 36 generates a first feedback signal V1 which depends on the difference between the output signal of the first controlling amplifier 27 and the second controlling amplifier 28. The first feedback signal V1 of the subtracting unit 36 is provided to the first sub-circuit 38. The first sub-circuit 38 is designed for the control of the first duration t1. The first feedback signal V1 of the subtracting unit 36 is a function of the sum of the absolute value |VPOS| of the first output voltage VPOS and the absolute value |VNEG| of the second output voltage VNEG.

The sum of the voltages of the absolute value of the first output voltage VPOS and the absolute value of the second output voltage VNEG is regulated with the first duration t1. The difference between the absolute value of the first output voltage VPOS and the absolute value of the second output voltage VNEG is regulated with the ratio of the second duration divided by the third duration t2:t3. The first duration t1 is increased by the control circuit 37 if the sum of the absolute value of the first output voltage VPOS and the absolute value of the second output voltage VNEG is smaller than the steady state value and vice versa. The ratio t2:t3 decreases if the difference between the absolute value of the first output voltage VPOS and the absolute value of the second output voltage VNEG is more than the steady state value and vice versa. The first duration t1 refers to the amount of time during the first switch 17 is on that means in a conducting state. During the first duration t1, also the fourth switch is on. The ripple of a power ground current may be equal to two times of the inductor current. The power ground current is the current with flows through a first and a second storage capacitor as well as a first and a second load resistor. The first, second and third durations t1, t2, t3 are actively regulated by the control circuit 37.

In an alternative embodiment, the fourth switch 21 is switched on for a shorter or longer duration than the first duration t1. If the fourth switch 21 is on before the first switch 17 and turned off after the first switch 17 turned off, then the first switch 17 is advantageously switched at a zero voltage across the first switch 17.

In an alternative, not shown embodiment, the switching arrangement 14 comprises a fourth phase D with a fourth duration t4. Thus, the cycle time T can be calculated according to the following equation:

$$T = t1 + t2 + t3 + t4,$$

wherein t4 is the duration of the time for which the inductor current ILC remains zero. This mode of operation is a discontinuous conduction mode.

In an alternative embodiment, the voltage converter 10 does not comprise the current sensor 42. Only a voltage mode control is used for the regulation of the first and the second output voltages VPOS, VNEG. In this case the inductor current ILC is not sensed.

In an alternative embodiment, the voltage converter 10 is operated in such a way that only the first output voltage VPOS is generated. In this case, the third duration t3 is zero. Alternatively, only the second output voltage VNEG is generated. In that case, the second duration t2 equals zero.

In an alternative, not shown embodiment, the voltage converter 10 uses the charging phase A as well as the positive and the negative discharging phase B, C, in the sequence A, C, B and not in the sequence A, B, C as shown in FIG. 1Aa.

In an alternative embodiment, the first, second, third and fourth switch 17, 19, 20, 21 are switched off for a predetermined duration before and after the switching cycle.

In an alternative, not shown embodiment, the inverting input and the non-inverting input of the first controlling amplifier 27 can be interchanged. Also the inverting input and the non-inverting input of the second controlling amplifier 28 can be interchanged.

In an alternative, not shown embodiment, the second and/or the fourth switch 19, 21 are realized as rectifiers, such as diodes.

Figure 1B:
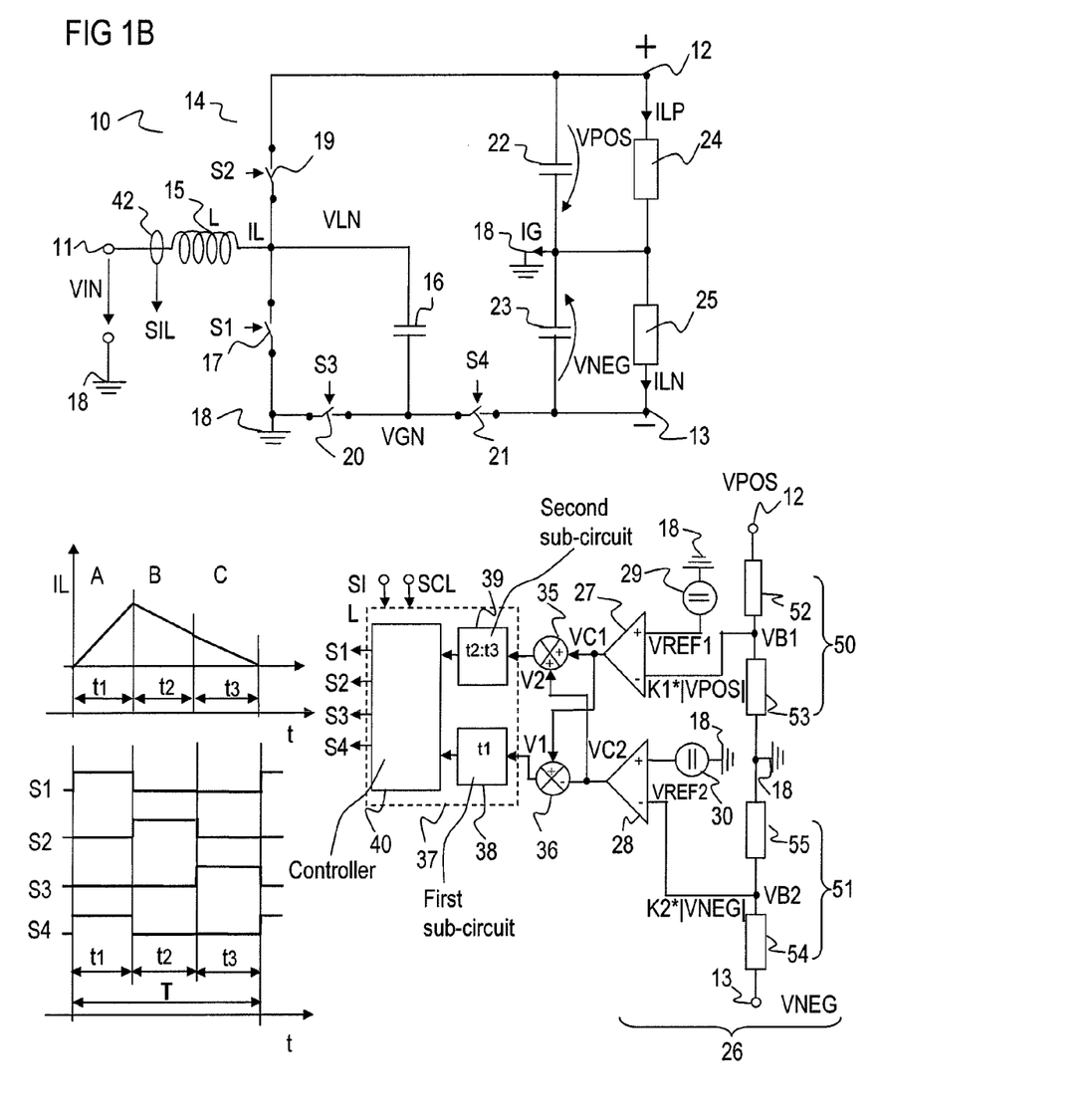

FIG. 1B shows an alternative exemplary embodiment of a voltage converter according to the principle presented. The voltage converter according to FIG. 1B is a further development of the voltage converter shown in FIG. 1A. The feedback unit 26 comprises a first and a second voltage divider 50, 51. The first voltage divider 50 comprises a series circuit of a fourth and a fifth resistor 52, 53. The series circuit of the fourth and the fifth resistor 52, 53 couples the first output 12 to the reference potential terminal 18. A node between the fourth and the fifth resistor 52, 53 is connected to the first input of the first controlling amplifier 27. The second voltage divider 51 comprises a series circuit of a sixth and a seventh resistor 54, 55. The series circuit of the sixth and the seventh resistor 54, 55 is arranged between the second output 13 and the reference potential terminal 18. A node between the sixth and the seventh resistor 54, 55 is connected to the first input of the second controlling amplifier 28.

The first voltage divider 50 generates the first divider voltage VB1 and the second voltage divider 51 generates the second divider voltage VB2. Thus, the first divider voltage VB1 and the second divider voltage VB2 which are supplied to the first input of the first and the second controlling amplifier 27, 28 can be calculated according to the following equations:

$$VB1 = K1 \cdot |VPOS| \text{ and } VB2 = K2 \cdot |VNEG|,$$

wherein K1 and K2 are constant, |VPOS| is the absolute value of the first output voltage and |VNEG| is the absolute value of the second output voltage. Thus, the first and the second divider voltages VB1, VB2 are independently generated for the first inputs of the first and the second controlling amplifier 27, 28. The voltage divider 31 of FIG. 1A is omitted. The voltage converter 10 according to FIG. 1B shows the method of an independent feedback.

In an alternative, not shown embodiment, the first voltage divider 50 couples the first output 12 to a further reference potential terminal. Thus, the fifth resistor 53 is connected to the further reference potential terminal. A potential of the further reference potential terminal is different from the ground potential at the reference potential terminal 18.

In an alternative, not shown embodiment, the second voltage divider 51 is arranged between the second output 13 and the further reference potential terminal or an additional reference potential terminal. Thus, the seventh resistor 55 is connected to the further reference potential terminal or the additional reference potential terminal. A potential at the additional reference potential terminal is different from the ground potential at the reference potential terminal 18.

Figure 1C:
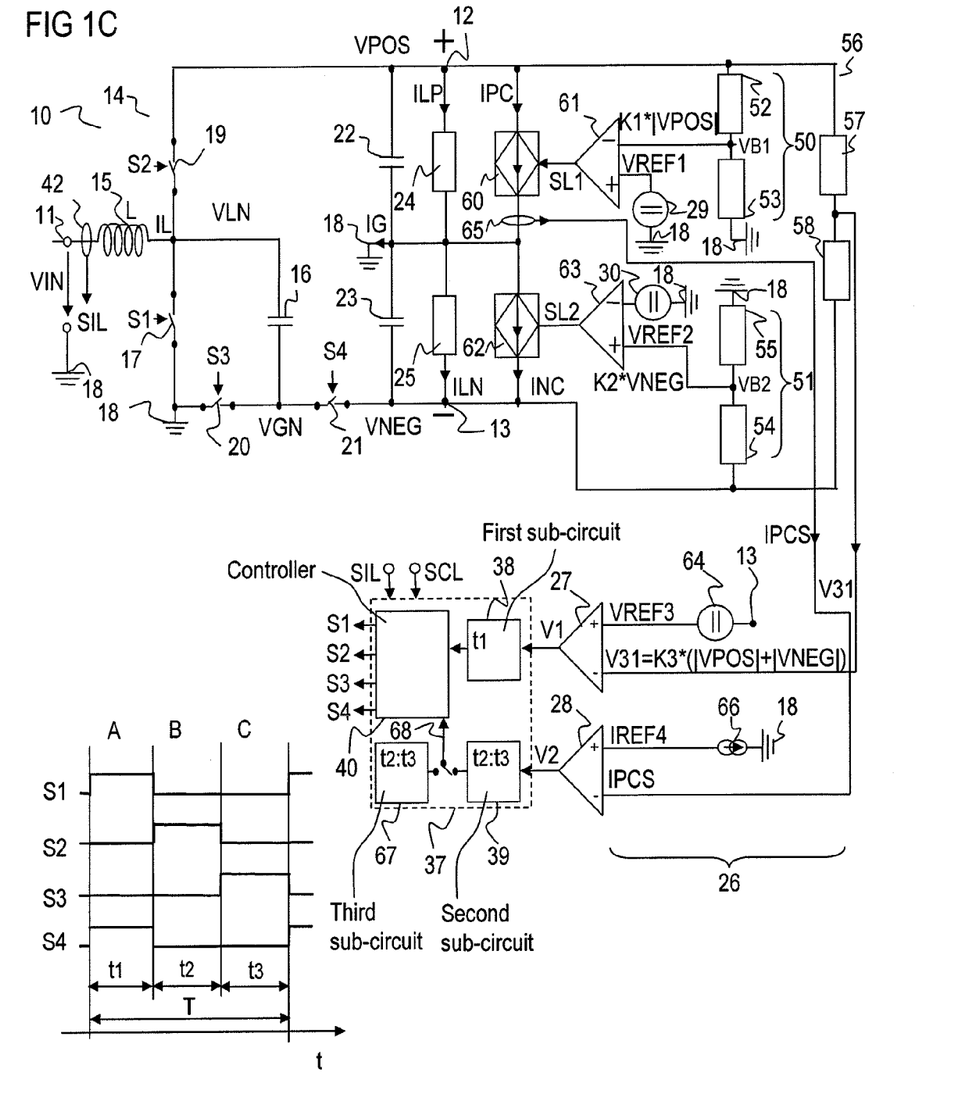

FIG. 1C shows another exemplary embodiment of a voltage converter according to the principle presented. The voltage converter 10 according to FIG. 1C is a further development of the voltage converters of FIGS. 1A and 1B. The voltage converter 10 additionally comprises a first current source 60 which is arranged between the first output 12 and the reference potential terminal 18. A first amplifier 61 has an output which is connected to a control input of the first current source 60. A first input of the first amplifier 61 is coupled to the first output 12. A second input of the first amplifier 61 is coupled via the first reference voltage source 29 to the reference potential terminal 18.

Moreover, the current converter 10 comprises a second current source 62. The second current source 62 is arranged between the second output 13 and the reference potential terminal 18. A second amplifier 63 of the voltage converter 10 has an output which is connected to a control input of the second current source 62. A first input of the second amplifier 63 is coupled to the second output 13. A second input of the second amplifier 63 is coupled via the second reference voltage source 30 to the reference potential terminal 18. Moreover, the voltage converter 10 comprises the first and the second voltage divider 50, 51 as shown in FIG. 1B. The first and the second voltage divider 50, 51 are coupled to the first inputs of the first and the second amplifier 61, 63.

A first input of the first controlling amplifier 27 is coupled to the first and the second output 12, 13. The voltage converter 10 comprises an additional voltage divider 56 having a first and a second divider resistor 57, 58. The additional voltage divider 56 is arranged between the first output 12 and the second output 13. A node between the first and the second divider resistor 57, 58 is connected to the first input of the first controlling amplifier 27. The second input of the first controlling amplifier 27 is coupled via a third reference voltage source 64 to the second output 13. Furthermore, the voltage converter 10 comprises a positive current sensor 65. The positive current sensor 65 is designed to measure the first current IPC which flows through the first current source 60. The positive current sensor 65 is arranged between the first current source 60 and the reference potential terminal 18. An output of the positive current sensor 65 is coupled to the first input terminal of the second controlling amplifier 28. A current reference source 66 couples the second input of the second controlling amplifier 28 to the reference potential terminal 18. The first controlling amplifier 27 is connected to the first sub-circuit 38. Similarly, the second controlling amplifier 28 is coupled to the input of the second sub-circuit 39.

Moreover, the control circuit 37 comprises a third sub-circuit 67 and a change-over switch 68. The output of the second sub-circuit 39 is connected to a first input of the change-over switch 68. An output of the third sub-circuit 67 is connected to a second input of the change-over switch 68. An output of the change-over switch 68 is connected to the controller 40.

The first current source 60 is controlled such that a difference between the first divider voltage VB1 and the first reference voltage VREF1 is minimized. Similarly, the second current source 62 is controlled such that a difference between the second divider voltage VB2 and the second reference voltage VREF2 is minimized. A first amplifier signal SL1 of the first amplifier 61 having a first amplification factor KA1 and a second amplifier voltage SL2 of the second amplifier 63 having a second amplification factor KA2 can be calculated according to the following equations:

$$SL1 = KA1 \cdot (VREF1 - K1 \cdot |VPOS|) \text{ and}$$

$$SL2 = KA2 \cdot (K2 \cdot |VNEG| - VREF2)$$

The third reference voltage source 64 generates a third reference voltage VREF3. The first feedback signal V1 which is applied to the first sub-circuit 38 can be calculated according to the following equation:

$$V1 = K4 \cdot (VREF3 - K3 \cdot (|VPOS| + |VNEG|)),$$

wherein K4 is an amplification factor of the first controlling amplifier 27. The positive current sensor 65 provides a positive current signal IPCS. The second feedback signal V2 which is applied to the second sub-circuit 39 is calculated according to the following equation:

$$V2 = K5 \cdot (IREF4 - IPCS),$$

wherein K5 the amplification factor of the second controlling amplifier 28.

The sum of the absolute value of the first output voltage VPOS and of the absolute value of the second output voltage VNEG is regulated with the first controlling amplifier 27. The first output voltage VPOS is regulated with the first current source 60 and the first amplifier 61. The second output voltage VNEG is regulated by means of the second current source 62 and the second amplifier 63.

A first current IPC flows through the first current source 60. Similarly, a second current INC flows through the second current source 62. If the first current IPC is not equal to the second current INC, then one current source of a group comprising the first and the second current source 60, 62 is activated to balance the load which is connected to the first and to the second terminal 12, 13. A ground current IG flows from the first and the second load resistor 24, 25 as well as the first and the second current source 60, 62 to the reference potential terminal 18. By means of the first and the second current source 60, 62 a fine tuning of the values of the first and the second output voltage VPOS, VNEG can be achieved. The balancing results in a ground current IG with zero value.

If the controller 40 is connected via the change-over switch 68 to the third sub-circuit 67, a fixed ratio t2:t3 of the second duration t2 to the third duration t3 is used. In that case the first or the second current IPC, INC are in steady state and may be large resulting in a non-optimal efficiency. The first current IPC or the second current INC can be minimized by the second controlling amplifier 28 and the second sub-circuit 39. By this regulation, the positive current signal IPCS of the first current sensor 65 is regulated to the current reference value IREF4 which is provided by the current reference source 66. The voltage converter 10 according to FIG. 1C shows the method of load balancing.

In an alternative, not shown embodiment, the voltage converter 10 comprises a negative current sensor that measures the second current INC.

Figure 1D:
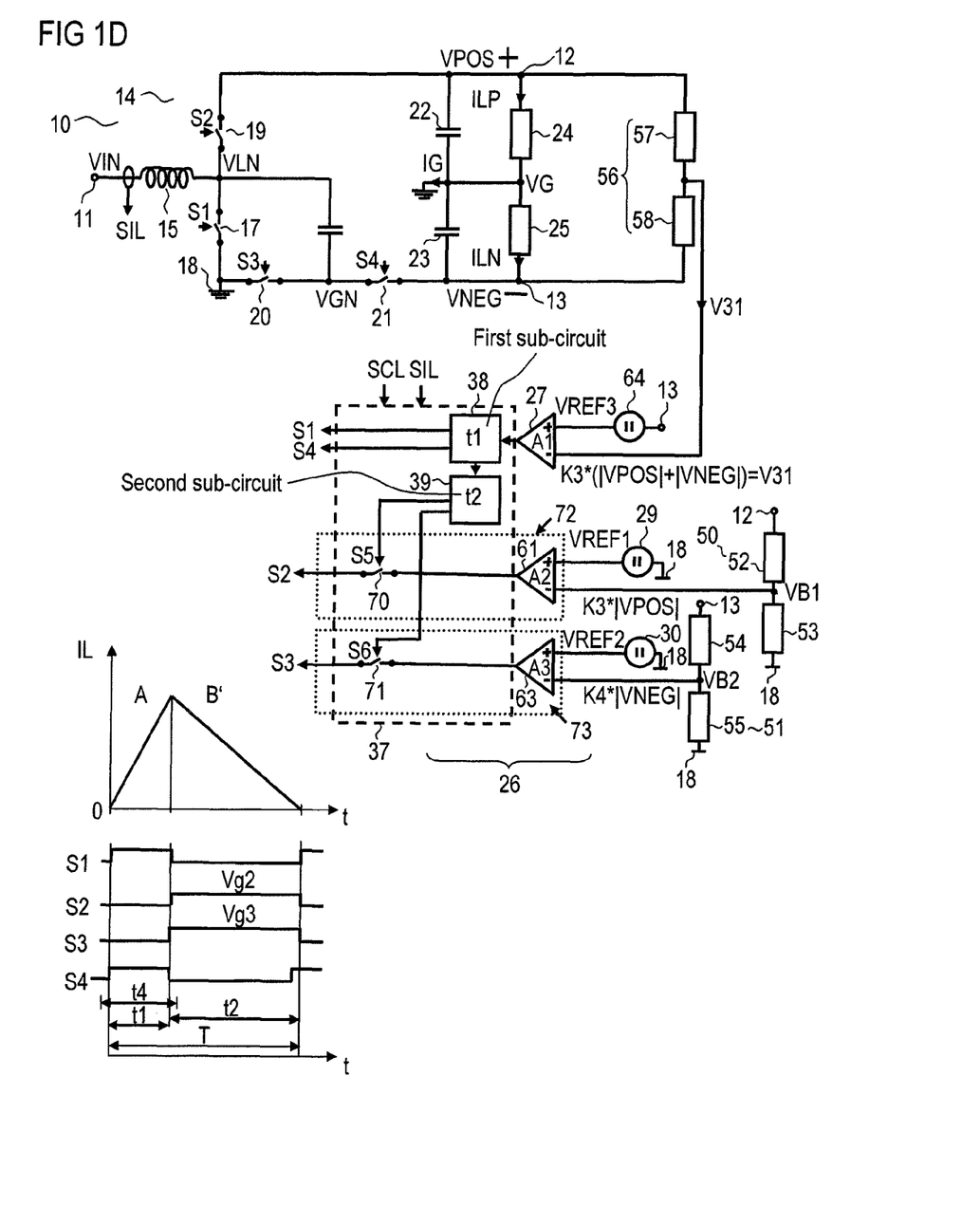

FIG. 1D shows an exemplary embodiment of a voltage converter according to the principle presented. The voltage converter according to FIG. 1D is a further development of the voltage converter shown in FIG. 1A to 1C. The voltage converter 10 comprises the first controlling amplifier 27. The first input of the voltage controlling amplifier 27 is coupled to the first and to the second output 12, 13. The second input of the first controlling amplifier 27 is coupled via the third reference source 64 to the second output 13. Moreover, the voltage converter 10 comprises the first and the second amplifier 61, 63. The inputs of the first and the second amplifier 61, 63 are connected to the reference voltage sources 29, 30 and are coupled to the first and to the second output 12, 13 as shown in FIG. 1C.

The first controlling amplifier 27 is connected to the first sub-circuit 38. A first and a second output of the first sub-circuit 38 are connected to the control terminal of the first and the fourth switch 17, 21. The control circuit 37 comprises a first and a second control switch 70, 71. The first control switch 70 couples the output of the first amplifier 61 to the second output of the control circuit 37 which is connected to the control terminal of the second switch 19. Furthermore, the second control switch 71 couples the output of the second amplifier 63 to the third output of the control circuit 37 which is connected to the control terminal of the third switch 20. A further output of the first sub-circuit 38 is connected to an input of the second sub-circuit 39. The second sub-circuit is connected to the control terminals of the first and the second control switch 70, 71 via two outputs of the second sub-circuit 39. A first analog controller 72 comprises the first control switch 70 and the first amplifier 61. A second analog controller 73 comprises the second control switch 71 and the second amplifier 63.

The mode of operation of the voltage converter 10 according to FIG. 1D comprises the maximum of two phases. In the charging phase A, energy is provided to the inductor 15, whereas in the discharging phase B' the energy is provided both to the first and the second output 12, 13. The first and the fourth switch 17, 21 are on in the charging phase A. The second and third switch 19, 20 are open in the charging phase A. Thus, the charging phase A of FIG. 1D is equal to the charging phase A of the FIGS. 1A to 1C. In the discharging phase B', the second and the third switch 19, 20 are closed, whereas the first and the fourth switch 17, 21 are open. The cycle time T is the sum of the first duration t1 of the charging phase A and of the second duration t2 of the discharging phase B'.

The first amplifier 61 provides the second control signal S2 with an analog value. Similarly, the second amplifier 63 generates the third control signal S3 with an analog value. Therefore, the second and the third switch 19, 20 are regulated such that they obtain an open state, an closed state closed and states with a resistance value between open and closed. The second and the third switch 19, 20 are controlled in an analog manner such that they obtain more than one resistance value between the resistance value at the open state and the resistance value at the closed state.

The sum of the absolute value of the first output signal VPOS and the absolute value of the second output voltage VNEG is regulated with the first controlling amplifier 27 and the first sub-circuit 38 by controlling the first duration t1. The first output voltage VPOS is regulated by operating the second switch 19 by means of the second control signal S2 in the linear region of the second switch 19. The second control signal S2 has a voltage which is regulated during the discharging phase B' with the first analog controller 72 comprising the first amplifier 61 and the first controller switch 70. Similarly, the third control signal S3 has the form of a voltage and is regulated during the positive discharging phase B' with the second analog controller 73 comprising the second amplifier 63 and the second switch 71. The voltage converter 10 according to FIG. 1D shows the method of a linear switch operation.

In an alternative embodiment, the second control signal S2 and/or the third control signal S3 are applied for a smaller duration than the second duration t2. Thus, the second and/or the third control signal S2, S3 are generated in the first part of the discharging phase B' such that the second and the third switch 19, 20 show a resistance between the open and the closed state of the switches, whereas in a second part of the discharging phase B' the second and/or the third switch 19, 20 are in an open state.

In an alternative embodiment, the first duration t1 is fixed to some predetermined value. Thus, the first duration t1 is not controlled by the first controlling amplifier 27.

In an alternative embodiment, the fourth switch 21 is closed during a fourth duration t4 which is longer than the first duration t1. Thus, the fourth switch 21 is closed before the first switch 17 is closed and the fourth switch 21 is opened after the first switch 17 is opened. The fourth duration t4 is indicated in the FIG. 1D.

In an alternative, not shown embodiment, the second analog controller 73 generates the fourth control signal S4 which is an analog signal instead of the third control signal S3 during the fourth duration T4. The third control signal S3 is a digital signal and is generated out of the first sub-circuit 38.

In an alternative embodiment, only one of the first and the second analog controller 72, 73 is active. Alternatively, none of the two analog controllers 72, 73 is active.

In an alternative embodiment, the first duration t1 is smaller than the fourth duration t4.

Figure 1E:
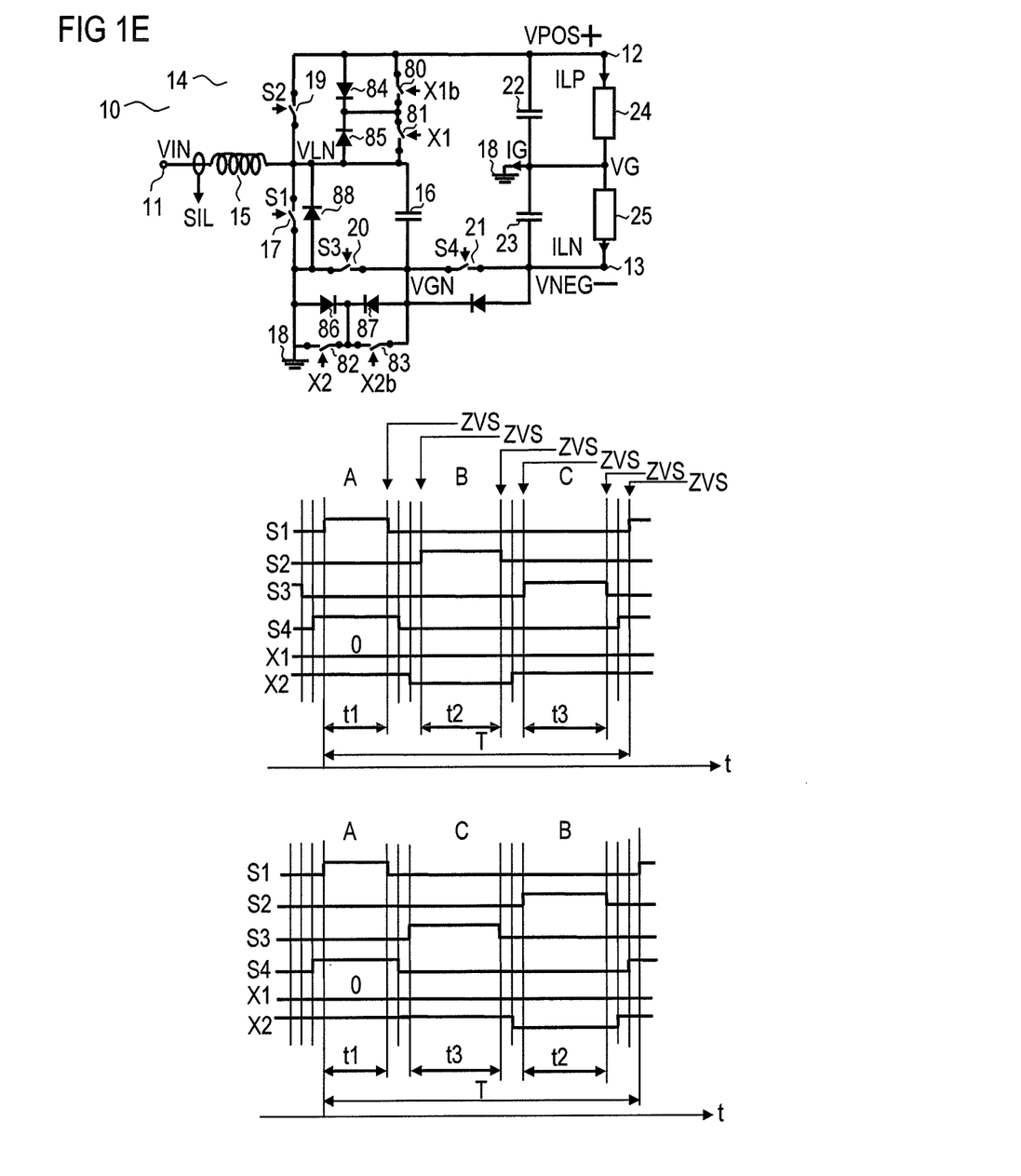

FIG. 1E shows a further exemplary embodiment of a voltage converter according to the principle presented. The voltage converter according to FIG. 1E is a further development of the voltage converter shown in FIG. 1A to 1B. The switching arrangement 14 comprises a series circuit of a first and a second additional switch 80, 81. The series circuit of the first and the second additional switch 80, 81 is arranged in parallel to the second switch 19. A node between the first and the second additional switch 80, 81 is connected to a substrate of the second switch 19. Moreover, the switching arrangement 14 comprises a series circuit of a first and a second further switch 82, 83. The series circuit of the first and the second further switch 82, 83 is connected in parallel to the third switch 20. Correspondingly, a node between the first and the second further switch 82, 83 is connected to a substrate of the third switch 20.

In FIG. 1E, a first diode 84 connects one terminal of the second switch 19 with the substrate of the second switch 19. A second diode 85 connects a second terminal of the second switch 19 to the substrate of the second switch 19. The first and the second diode 84, 85 only represent the diodes between the source and the substrate and the drain and substrate respectively and are not realized as discrete and separate diodes. In case the first output voltage VPOS has a higher value in comparison to the voltage of the substrate of the second switch 19, a current flows from the first output 12 to the substrate of the second switch 19. In addition a third and a fourth diode 86 and 87 are shown in FIG. 1E which represent the source to substrate diode and the drain to substrate diode of the third switch 20.

The first, second, third and fourth switch 17, 19, 20, 21 are realized as field-effect transistors. Preferably, the four switches are implemented as metal-oxide-semiconductor field-effect transistors, abbreviated MOSFET. The first and the fourth switch 17, 21 can be realized as n-channel MOSFET. The second and the third switch 19, 20 can be fabricated as p-channel MOSFET. The control circuit 37 that is not shown in FIG. 1E is coupled on its output side to the control terminals of the first and second additional switch 80, 81 and to the first and the second further switch 82, 83.

The two different cycles shown in FIG. 1E are chosen if the first output voltage VPOS is larger than the absolute value of the second output voltage VNEG. In the upper embodiment of the cycle, the cycle comprises the charging phase A, the positive and the negative discharging phase B, C in such a sequence that the positive discharging phase B follows the charging phase A and the negative discharging phase C follows the positive discharging phase B. In that case a seventh signal X1 is provided to the second additional switch 81 by the control circuit 37 such that the second additional switch is in an open state. An inverted seventh signal X1B which is provided to the first additional switch 80 is the inverse signal to the seventh signal X1. Thus, the inverted seventh signal X1B is provided to the first additional switch 80 with a value which sets the first additional switch 80 in a closed state during all phases of the cycle.

An eights signal X2 is provided to the first further switch 86 which sets the first further switch 82 in an open state during the positive discharging phase B and in a closed state during the charging phase A and the negative discharging phase C. An inverted eights signal X2B is the inverted signal to the eights signal X2. The signal X2B is provided to the control terminal of the second further switch 83. Thus, the second further switch 83 is in a closed state during the positive discharging phase B and in an open state during the charging phase A and the negative discharging phase C. The cycle comprises three intermediate phases D, E, F between the charging phase A and the positive discharging phase B. Furthermore, the cycle comprises two intermediate phases G, H between the positive and the negative discharging phase B, C. Additionally, the cycle comprises two further intermediate phases I, J between the negative charging phase C and the charging phase A. The values of the first, the second, the third, the fourth, the seventh and the eights control signal S1, S2, S3, S4, X1, X2 are shown in FIG. 1E.

At the end of one phase, only one switch changes its state. This is not only valid for the charging phase A and the positive and the negative discharging phase B, C, but also for the intermediate phases.

In the lower embodiment, the cycle comprises the first, the second and the negative discharging phase A, B, C in such an order that the negative discharging phase C follows the charging phase A and the positive discharging phase B follows the negative discharging phase C. In this case also the seventh signal X1 has a value which sets the second additional switch 81 in an open state and the first additional switch 80 in a closed state in all phases of the cycle.

The eights control signal X2 is generated by the control circuit 37 in such a way that the first further switch 82 is in a closed state during the charging phase A and the negative discharging phase C and in an open state during the positive discharging phase B. The second further switch 83 is in an open state during the charging phase A and the negative discharging phase C and in a closed state during the positive discharging phase B. The cycle not only comprises the first, the second and the negative discharging phase A, B, C but also two intermediate phases between the charging phase A and the negative discharging phase C, two intermediate phases between the negative discharging phase C and the positive discharging phase B and three intermediate phases between the positive discharging phase B and the charging phase A.

According to the shown sequence of the first, second, third, fourth, the seventh and the eights control signal S1, S2, S3, S4, X1, X2, three of the four switches comprising the first, the second, the third and the fourth switch 17, 19, 20, 21 have a zero voltage switching that means that these switches are switched at a point of time whereas approximately zero voltage is applied between the two terminals of the switches. The method of serial voltage switching will reduce the switching losses.

Figure 1F:
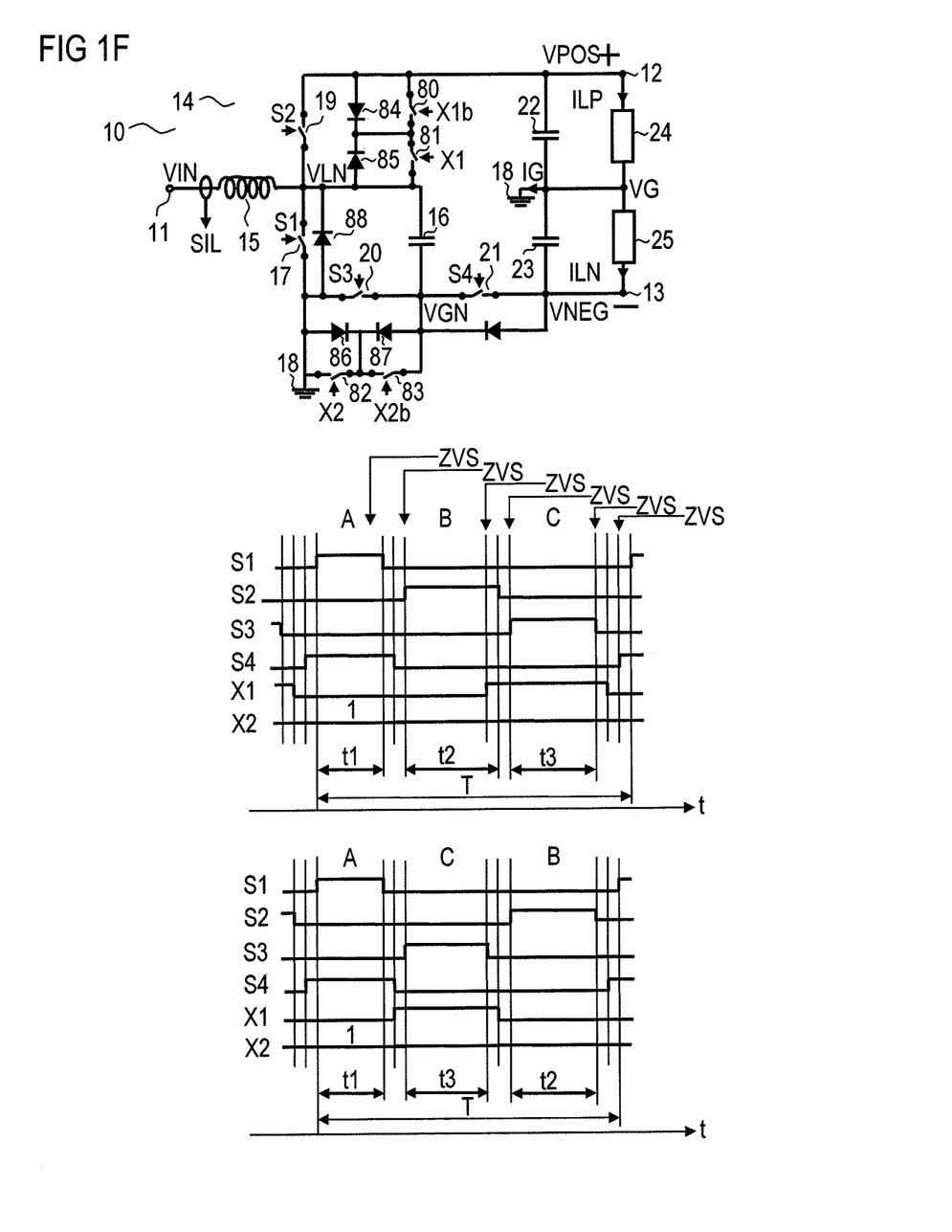

The control circuit 37 is designed such that it selects the cycle according to the two versions of the cycle according to FIG. 1E or the two versions of the cycle of FIG. 1F depending on a comparison of the absolute value of the first output signal VPOS and the absolute value of the second output signal VNEG. This leads to an improved efficiency of the voltage conversion.

FIG. 1F shows a further exemplary embodiment of a voltage converter according to the principle presented. The voltage converter according to FIG. 1F is a further development of the voltage converters shown in FIG. 1A to 1E. The two different cycles shown in FIG. 1F are chosen if the first output voltage VPOS is smaller than the second output voltage VNEG. The operation is similar to the operation of the voltage converter 10 shown in FIG. 1E.

Figure 1G:
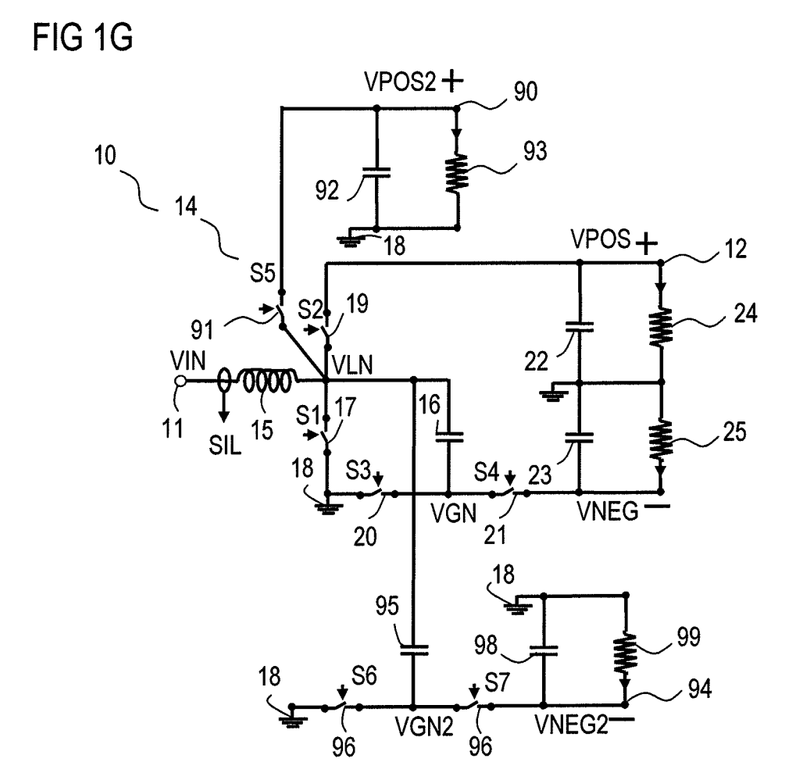

FIG. 1G shows a further exemplary embodiment of a voltage converter according to the principle presented. The voltage converter according to FIG. 1G is a further development of the voltage converters shown in FIG. 1A to 1F. The voltage converter 10 comprises a third output 90 and a fifth switch 91 which couples the second terminal of the inductor 15 to the third output 90. A third storage capacitor 92 connects the third output 90 to the reference potential terminal 18. A third load resistor 93 is arranged between the third output 90 and the reference potential terminal 18 and represents a load. Furthermore, the voltage converter 10 comprises a fourth output 94 and a second flying capacitor 95. A first electrode of the second flying capacitor 95 is connected to the second terminal of the inductor 15. Furthermore, the voltage converter 10 comprises a sixth and a seventh switch 96, 97 which are connected in series. The series connection of the sixth and the seventh switch 96, 97 couples the fourth output 94 to the reference potential terminal 18. A second electrode of the second flying capacitor 95 is coupled to a node between the sixth and the seventh switch 96, 97. A fourth storage capacitor 98 is arranged between the fourth output 94 and the reference potential terminal 18. A fourth load resistor 99 couples the fourth output 94 to the reference potential terminal 18. The fourth load resistor 99 represents a further load.

By means of the fifth switch 91, a third output voltage VPOS2 is applied to the third output 90. The third output voltage VPOS2 has an opposite polarity to the second output voltage VNEG. By means of the second capacitor 95 and the series circuit of the sixth and seventh switch 96, 97, a fourth output voltage VNEG2 is generated and applied to the fourth output 94. The voltage converter 10 of FIG. 1G is a multi-output converter and generates more than two output voltages. The first duration t1 of the charging phase A controls the sum of the absolute values of the four output voltages namely the first output voltage VPOS, the second output voltage VNEG, the third output voltage VPOS2 and the fourth output voltage VNEG2. The individual output voltages VPOS, VNEG, VPOS2, VNEG2 can be regulated by additional phases like the positive and the negative discharging phase B, C depending upon which output voltage of the first, the second, the third and the fourth output voltage VPOS, VNEG, VPOS2, VNEG2 is required to be regulated respectively.

Figure 1H:
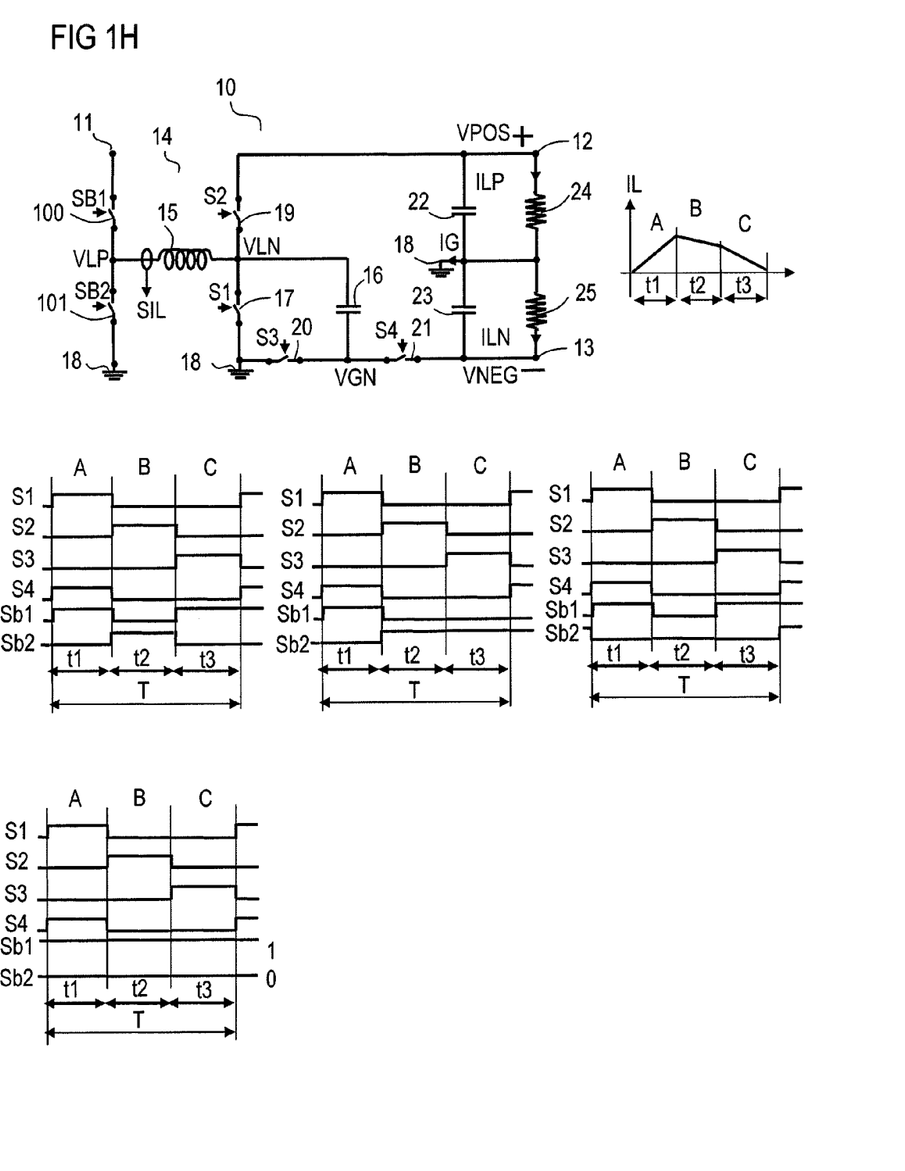

FIG. 1H shows a further exemplary embodiment of a voltage converter according to the principle presented. The voltage converter according to FIG. 1H is a further development of the voltage converters shown in FIG. 1A to 1G. The switching arrangement 14 comprises a first and a second input switch 100, 101. The first and the second input switch 100, 101 form a series circuit which couples the input 11 to the reference potential terminal 18. A node between the first and the second input switch 100, 101 is connected to the first terminal of the inductor 15. Thus, the voltage converter 10 is designed also for a buck-boost operation. If the first input switch 100 is continuously in a closed state and the second input switch 101 is continuously in an open state, the operation of the voltage converter 10 is similar to the operations shown in FIG. 1A to 1G. However, if the absolute value of the first output voltage VPOS is smaller than the absolute value of the input voltage VIN and/or the absolute value of the second output voltage VNEG is smaller than the absolute value of the input voltage VIN, then the first and the second input switch 100, 101 are switched according to one of the four cycles shown in FIG. 1H.

The control strategy of the voltage converter 10 shown in this figure can use any of the control strategies from the previous figures. The first and the second input switch 100, 101 can be operated like a switch having an open state and a closed state.

The voltage VLP at the node between the first and the second input switch 100, 101 experiences either the input voltage VIN or the ground potential at the reference potential terminal 18. The first, the second, the third and the fourth control signal S1, S2, S3, S4 are equal in the four exemplary cycles. However, the signals SB1, SB2 which are provided to the first and the second input switch 100, 101 are different for the four exemplary cycles. The signal SB2 which is provided to the second input switch 101 is an inverted signal in comparison to the signal SB1 that is provided to the first input switch 100 in the first, second and fourth embodiment of a cycle. The voltage converter 10 in the FIGS. 1A to 1G shows a buck-boost operation. By the additional switches, namely the first and the second input switch 100, 101, the flexibility for operation is increased so that a high efficiency can be achieved.

In an alternative embodiment, the first and the second input switch 100, 101 can be operated in a linear mode. Thus, the first and the second input switch 100, 101 not only have an open and a closed state but also at least one state with a resistance in between the open and the closed state.

In an alternative, not shown embodiment, the sequence of the phases is A, C, B instead of A, B, C as shown in FIG. 1H.

Figure 2:
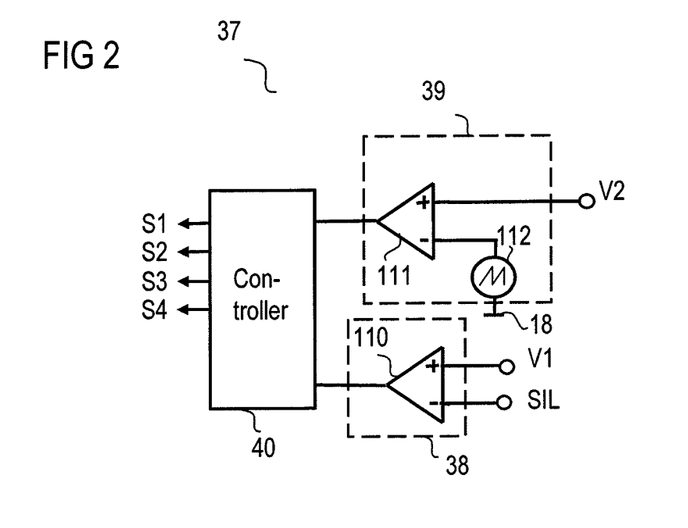
FIG. 2 shows an exemplary embodiment of a control circuit.

FIG. 2 shows an exemplary control circuit 37 that can be inserted in the voltage converter of FIGS. 1A to 1H. The first sub-circuit 38 comprises a first comparator 110. The first feedback signal V1 and the current sensor signal SIL are provided to the two inputs of the first comparator 110. An output of the first comparator 110 is connected to the controller 40. The second sub-circuit 39 comprises a second comparator 111 and a ramp generator 112. The second feedback signal V2 is provided to a first input of the second comparator 111. The ramp generator 112 couples a second input of the second comparator 111 to the reference potential terminal 18. An output of the second comparator 111 is connected to the controller 40. Both comparators 110, 111 provide digital signals at their outputs. The controller 40 is a microcontroller or a microprocessor.

Figure 3:
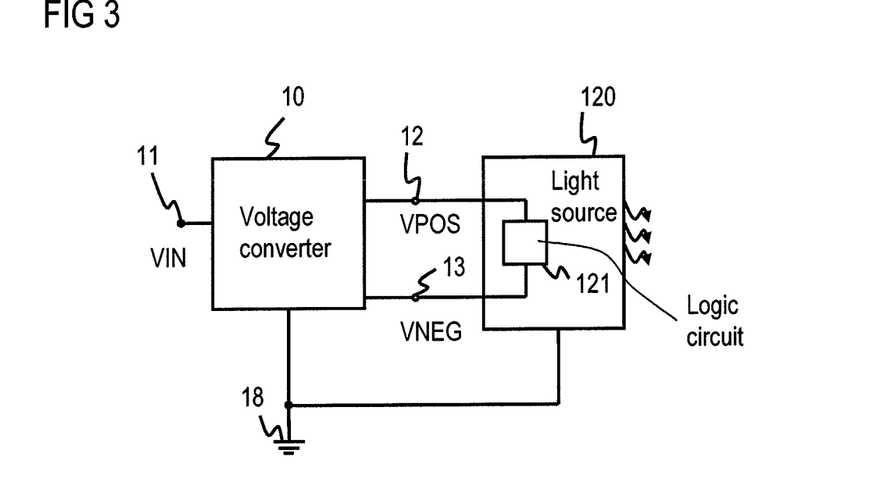
FIG. 3 shows an exemplary arrangement comprising the voltage converter of the invention.

FIG. 3 shows an exemplary arrangement comprising the voltage converter 10 according to one of the previous figures. The arrangement further comprises a light source 120. The light source 120 is connected to the first output 12 of the voltage converter 13 and to the second output 13 of the voltage converter 10. The light source 120 is additionally connected to the reference potential terminal 18. The light source 120 comprises a light emitting diode. The light emitting diode is realized as an organic light emitting diode, abbreviated OLED. The light source 120 is realized as a matrix. The light source 120 is implemented as an active-matrix organic light-emitting diode, abbreviated AMOLED. The voltage converter 10 provides a positive and a negative supply to the light source 120. The voltage converter 10 additionally drives a logic circuit 121 which is comprised by the light source 120. The light source 120 requires both the first output voltage VPOS with a positive polarity with respect to the reference potential terminal 18 and the second output voltage VNEG with a negative polarity with respect to the reference potential terminal 18. The voltage converter 10 advantageously provides a very small imbalance of the first output voltage VPOS and of the second output voltage VNEG.

Figure 4:
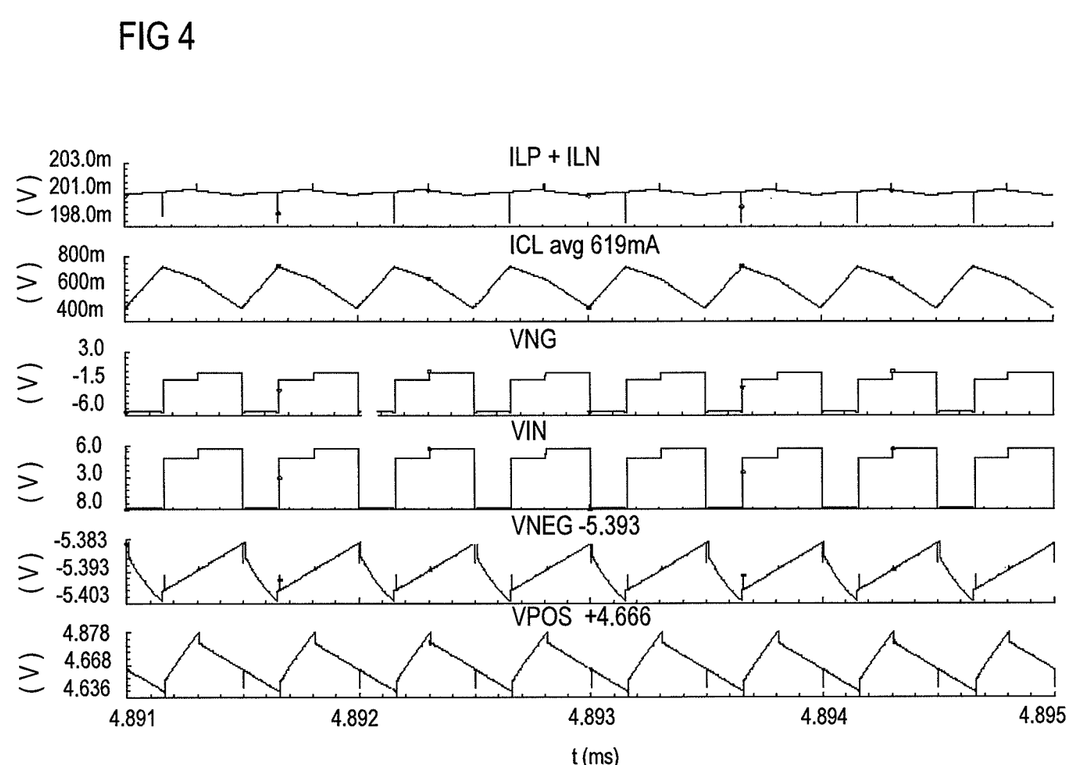
FIG. 4 shows exemplary characteristics of a voltage converter of the invention.

FIG. 4 shows exemplary characteristics of a voltage converter according to the principle presented. FIG. 4 shows the load current IL, the inductor current ILC, the voltage VGN at the node between the third and the fourth switch 20, 21, the voltage VLN at the second terminal of the inductor 15, the second output voltage VNEG and the first output voltage VPOS as a function of the time t. The characteristics were received by a simulation in an open loop condition. The following values were assumed: the input voltage VIN equals 3.7 V, the bonding resistance is 25 mOhm, the resistance of the first, the second, the third and the fourth switch, 17, 19, 20, 21 is 100 mOhm, the inductivity of the inductor 15 equals 4.7 m Henry with an equivalent series resistance, abbreviated ESR, of 10 mOhm, the value of first and second storage capacitor 22, 23 has 4.7 micro F and an ESR of 5 mOhm, the capacitance of the flying capacitor 16 has a value of 2.2 micro F and an ESR of 5 mOhm, the frequency of the clock signal is 2 MHz and a zero switching time was assumed.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A voltage converter, comprising:
   an input for receiving an input voltage;
   a first output for providing a first output voltage;
   a second output for providing a second output voltage, wherein the first output voltage and the second output voltage have opposite polarities; and
   a switching arrangement that is configured
      to provide energy to an inductor in a charging phase of operation, and
      to provide energy from the inductor to the first output and, via a flying capacitor, to the second output in a discharging phase of operation,
   wherein the switching arrangement comprises a first switch and an additional switch,
   wherein the input of the voltage converter is coupled to a first terminal of the inductor, a second terminal of the inductor is coupled via the first switch to a reference potential terminal and is connected to a first electrode of the flying capacitor, and a second electrode of the flying capacitor is coupled via the additional switch to the reference potential terminal, and
   wherein a first duration of the charging phase of operation is controlled such that a difference between a first predetermined value and a sum of the absolute values of the first output voltage and of the second output voltage is minimized.

2. The voltage converter according to claim 1, comprising:
   a first storage capacitor that is connected to the first output; and
   a second storage capacitor that is connected to the second output,
   wherein the discharging phase of operation comprises a positive discharging phase and a negative discharging phase and the amount of energy provided to the first storage capacitor depends on a second duration of the positive discharging phase as well as the amount of energy provided to the second storage capacitor depends on a third duration of the negative discharging phase.

3. The voltage converter according to claim 2, wherein the difference of the absolute value of the first output voltage and the absolute value of the second output voltage is controlled by the ratio of the second duration of the positive discharging phase and the third duration of the negative discharging phase.

4. The voltage converter according to claim 1, wherein the inductor and the flying capacitor are connected in series such that the inductor is permanently connected to the flying capacitor.

5. The voltage converter according to claim 1, comprising a feedback unit that is coupled on its input side to the first output of the voltage converter and to the second output of the voltage converter and is designed to provide a first feedback signal which depends on the sum of the absolute value of the first output voltage and the absolute value of the second output voltage and a second feedback signal which depends on the difference between the absolute value of the first output voltage and the absolute value of the second output voltage.

6. The voltage converter according to claim 1, comprising:
   a first controlling amplifier having
      a first input which is coupled to the first output of the voltage converter, and
      a second input to which a first reference voltage is provided; and
   a second controlling amplifier having
      a first input which is coupled to the second output of the voltage converter and
      a second input to which a second reference voltage is provided.

7. The voltage converter according to claim 6, comprising:
   an adding unit having
      a first input which is coupled to an output of the first controlling amplifier, and
      a second input which is coupled to an output of the second controlling amplifier; and
   a subtraction unit having
      a first input that is coupled to the output of the first controlling amplifier, and
      a second input which is coupled to the output of the second controlling amplifier.

8. The voltage converter according to claim 1, wherein the switching arrangement comprises:
   a first input switch which couples the input terminal of the voltage converter to the first terminal of the inductor, and a second input switch which couples the first terminal of the inductor to the reference potential terminal.

9. The voltage converter according to claim 1, wherein the switching arrangement comprises a series circuit of a first further switch and a second further switch, and wherein the series circuit of the first and the second further switches is connected in parallel to the additional switch.

10. The voltage converter according to claim 1, wherein the switching arrangement comprises a second switch and a further switch, wherein the second terminal of the inductor is coupled via the second switch to the first output and the second electrode of the flying capacitor is coupled to the second output of the voltage converter via the further switch.

11. The voltage converter according to claim 10, wherein the switching arrangement comprises a series circuit of a first additional switch and a second additional switch, wherein the series circuit of the first and the second additional switches is arranged in parallel to the second switch.

12. The voltage converter according to claim 1, wherein at least one switch out of a group comprising a second switch and the additional switch is controlled in an analog manner such that the at least one switch alternatively is in an open state, a closed state, and at least one intermediate state, wherein the second terminal of the inductor is coupled via the second switch to the first output.

13. The voltage converter according to claim 1, comprising a first current source for controlling the absolute value of the first output voltage by reducing the first output voltage by means of a first source current through the first current source, wherein the first source current depends on the first output voltage and a first set value of the first output voltage.

14. A voltage converter, comprising:
an input for receiving an input voltage;
a first output for providing a first output voltage;
a second output for providing a second output voltage, wherein the first output voltage and the second output voltage have opposite polarities;
a switching arrangement that is configured
to provide energy to an inductor in a charging phase of operation, and
to provide energy from the inductor to the first output and, via a flying capacitor, to the second output in a discharging phase of operation;
a first controlling amplifier comprising,
a first input which is coupled to the first output of the voltage converter, and
a second input to which a first reference voltage is provided;
a second controlling amplifier comprising,
a first input which is coupled to the second output of the voltage converter, and
a second input to which a second reference voltage is provided;
an adding unit comprising,
a first input which is coupled to an output of the first controlling amplifier, and
a second input which is coupled to an output of the second controlling amplifier; and
a subtraction unit comprising,
a first input that is coupled to the output of the first controlling amplifier, and
a second input which is coupled to the output of the second controlling amplifier,
wherein a first duration of the charging phase of operation is controlled such that a difference between a first predetermined value and a sum of the absolute values of the first output voltage and of the second output voltage is minimized.

15. A method for voltage conversion comprising:
receiving an input voltage;
storing energy in an inductor during a charging phase of operation;
transferring energy, during a discharging phase, from the inductor to (i) a first output such that a first voltage is provided, and (ii) a second output, via a flying capacitor, such that a second voltage is provided, wherein the first output voltage and the second output voltage have opposite polarities; and
controlling a first duration of the charging phase of operation such that a difference between a first predetermined value and a sum of the absolute values of the first output voltage and of the second output voltage is minimized,
wherein a switching arrangement is configured to facilitate the storing energy and the transferring energy, the switching arrangement comprising a first switch and an additional switch, wherein an input for receiving the input voltage is coupled to a first terminal of the inductor, a second terminal of the inductor is coupled via the first switch to a reference potential terminal and is connected to a first electrode of the flying capacitor, and a second electrode of the flying capacitor is coupled via the additional switch to the reference potential terminal.

* * * * *